Nov. 30, 1965           A. E. MOULTON           3,220,748

FRAME FOR TWO-WHEELED CYCLE VEHICLE

Filed Oct. 11, 1963           3 Sheets-Sheet 1

INVENTOR
Alexander Eric Moulton
BY
Shoemaker and Mattere
ATTORNEY

Nov. 30, 1965                A. E. MOULTON                3,220,748
                     FRAME FOR TWO-WHEELED CYCLE VEHICLE
Filed Oct. 11, 1963                                3 Sheets-Sheet 2

INVENTOR
Alexander Eric Moulton
BY
Shoemaker and Mattare
ATTORNEY

Nov. 30, 1965   A. E. MOULTON   3,220,748
FRAME FOR TWO-WHEELED CYCLE VEHICLE
Filed Oct. 11, 1963   3 Sheets-Sheet 3

INVENTOR
Alexander Eric Moulton
BY
Shoemaker and Mattare
ATTORNEY

United States Patent Office 3,220,748
Patented Nov. 30, 1965

3,220,748
FRAME FOR TWO-WHEELED CYCLE VEHICLE
Alexander Eric Moulton, Bradford-on-Avon, England, assignor to Moulton Consultants Limited, Bradford-on-Avon, England, a company of Great Britain
Filed Oct. 11, 1963, Ser. No. 315,468
Claims priority, application Great Britain, Oct. 19, 1962, 39,733/62
8 Claims. (Cl. 280—287)

The present invention realtes to two-wheeled cycle vehicles and in particular to bicycles and has for its object to provide a cycle vehicle whose frame can be collapsed into two sections which can be stowed separately in confined spaces.

Folding bicycles are known having frames comprising two or more sections which are hinged together and are capable of being folded when the vehicle is to be stored or transported. However, in the folded condition the two sections remain attached to one another and therefore the bicycle still forms a relatively bulky object which is inconvenient to handle and to stow away in a confined space, e.g., in the passenger or luggage space of an automobile.

If the bicycle is made so that its frame is separable into two or more independent sections, the sections may each be of relatively small size and may be stowed separately from one another. However, with such a bicycle it is important that the connecting and disconnecting of the frame sections is quickly and easily performed. In particular, when the frame sections are to be connected together so that the bicycle may be ridden, the actual connecting means must obtain a firm connection; with the frame sections being properly positioned relatively to one another so that the bicycle is as safe to ride as an ordinary bicycle which is not equipped with means whereby it may be readily collapsed or folded. It is, moreover, important that the junctions of the separable frame sections are disposed in regions of the frame which are relatively lightly stressed.

This invention provides a two-wheeled cycle vehicle having front and rear tyred wheels of an overall diameter of between 14 and 18 inches and with an open F-shaped frame, the front wheel being supported by means including a steering column surmounted by handlebars and mounted for rotation within an upwardly extending tubular frame member or front post, there being a single tubular frame member or backbone extending rearwardly in a straight line, substantially at right angles from the lower end of said front post to form the sole frame member connecting the front post with the remainder of the frame of the machine, and said backbone being formed of two interengaging sections which are separable from one another at a point which is nearer to said front post than it is to a seat tube which is surmounted by a saddle and which extends upwardly substantially at right angles from the rear section of the backbone.

The invention will be further described with reference to the accompanying drawings in which.

Figure 1:
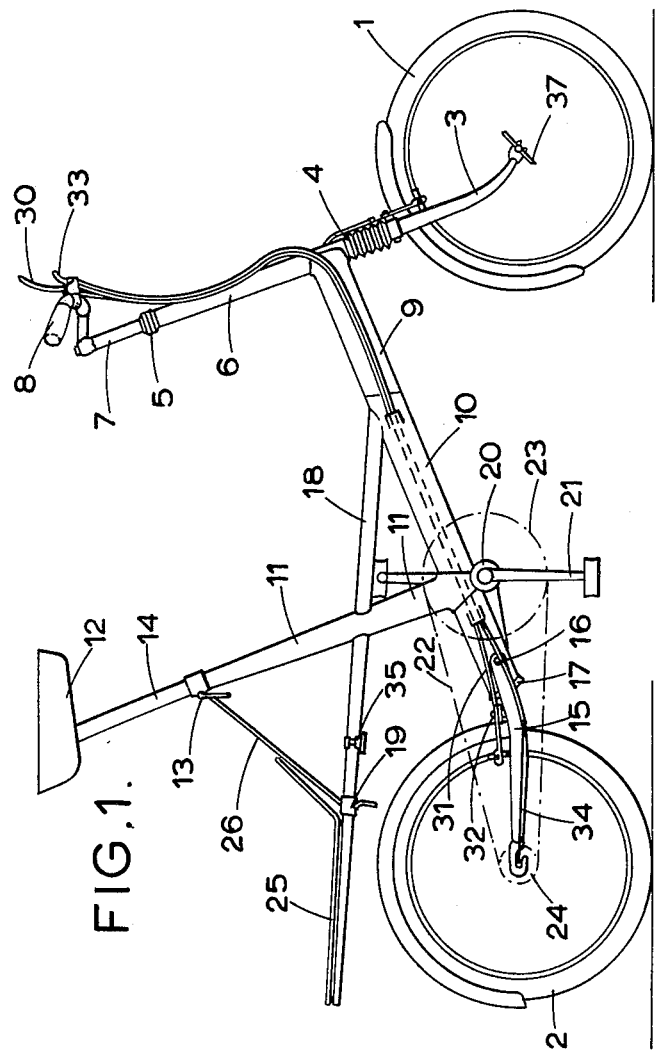
FIGURE 1 illustrates in side elevation a bicycle in fully assembled condition.

Referring now to FIGURE 1, the bicycle has front and rear rubber tyred wheels 1 and 2 respectively, each of an overall diameter of between 14 and 18 inches and preferably of sixteen inches.

The front wheel 1 is supported by fork arms 3 which are connected to a steering column which is mounted by bearings 4 and 5 for rotational movement within an upwardly extending tubular member 6 which forms a front post of an open F-shaped frame for the bicycle. The steering column is surmounted by a handlebar stem 7 and handlebars 8. Preferably the means by which the fork arms 3 are connected to the steering column within the front tube 6 are such as to allow resiliently controlled movement of the arms 3 in the direction of the axis of the tube 6 so as to provide a resilient suspension for the front wheel relative to the vehicle frame.

Extending rearwardly and downwardly from the lower end of the front post 6 is a main frame member or backbone which is formed of front and rear sections 9 and 10 which are separable from one another, as will be hereafter described.

Upstanding from the rear backbone section 10 is a seat tube 11 surmounted by a saddle 12 carried on a stem 14 secured within the tube 11 by a releasable clip 13.

The backbone section 10 extends rearwardly from its junction with the seat tube 11 to a point just ahead of the rear wheel 2, which latter is carried by arms 15 pivotally mounted at 16 on the section 10. A rubber spring 17 resiliently controls the pivotal movement of the arms 15 relative to the section 10.

A bracing member 18 extends from the upper side of the backbone section 10 at its forward end, and passes through the seat tube 11 to which it is adhered to extend rearwardly thereof to provide a mounting for a detachable carrier 25 secured by a clamp 19. The bracing member 18 provides strengthening for the frame in the region of the junction of the seat tube with the section 10.

The numeral 20 represents a housing for the crank axle of pedals 21 which via a chain 22 and chain wheel 23 drive the rear wheel sprocket 24. The housing 20 is adhered directly to the underside of the backbone section 10 immediately below the seat tube junction.

To support the carrier 25 a stay 26 extends downwardly from the clamp 13 to the clamp 19.

A cable 27 extends from a lever 28 secured to the handlebars 8 to control a calliper brake assembly 29 for the front wheel 1.

Also carried on the handlebars 8 on a single clamping device, by which together they can be readily detached from the handlebars 8, are firstly a lever 30 controlling, by means of a cable 31, a brake assembly 32 for the rear wheel 2 and secondly, a lever 33 which controls a gear changing device carried in the hub of the rear wheel 2, by means of a cable 34.

Figure 2:
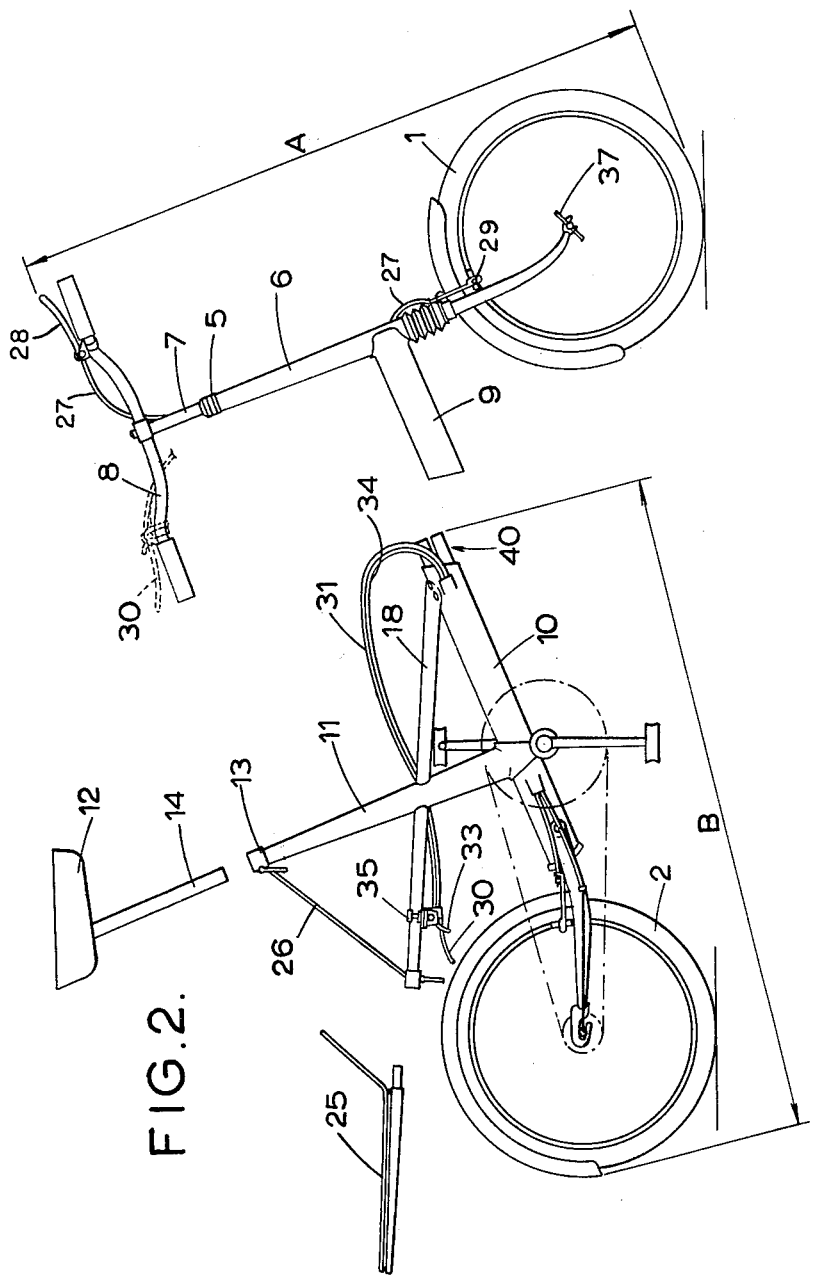
FIGURE 2 is a side view of the machine separated into various sections.

As shown in FIGURE 2 when the levers 30 and 33 are detached from the handlebars 8, they may be secured to a clamp 35 carried on the bracing member 18, and this is performed without disconnecting the cables from the levers and without altering the adjustment of the cables, so that when the levers 30 and 33 are resecured to the handlebars 8, they may be immediately ready for use to control the brake 32 and the gear changing device associated with the rear wheel of the machine.

FIGURE 2 shows the bicycle with the two backbone sections 9 and 10 separated. The stem 1 of the handlebars 8 may be rotated so that the handlebars are redisposed in line or parallel with the general plane of the wheel so that the front half of the machine constitutes a relatively flat object for convenience in stowing.

It will be seen that the maximum dimension A of the front half is substantially equal to the maximum dimension B of the rear half of the machine.

In some cases it may be necessary to obtain further reduction of the size of the rear half of the machine. In this case and as shown the clamp 13 may be manipulated to release the saddle stem 14 and the clamp 19 may be manipulated to release the carrier 25.

The overall size of the front section may also be further reduced simply by removal of the front wheel 1 which may be secured to the arms 3 by manually operable wing nuts 37.

However, in most cases, when the bicycle is to be stowed, the transfer of the levers 30 and 33 to the clamp 35 and the separation of the backbone sections 9 and 10 is all that is necessary. Reversal of this procedure is all that is necessary to prepare the bicycle for riding.

The rear sections of the cables 32 and 34 are preferably buried within the backbone section 10 and this will normally provide sufficient location for the cables when the bicycle is to be ridden.

From FIGURE 2 it will be seen that the rear section 10 is formed with sleeve means generally designated 40 which are adhered within its section and which project forwardly so that they can be inserted and clamped within the open rear end of the front section 9.

Figure 3:
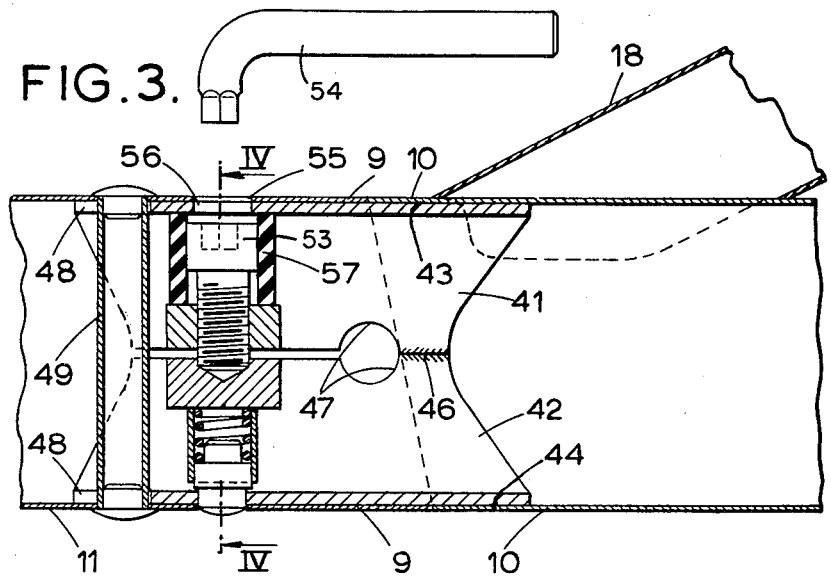
FIGURE 3 is a detailed side view taken in cross section showing the means by which two frame sections may be locked together or separated.
Figure 4:
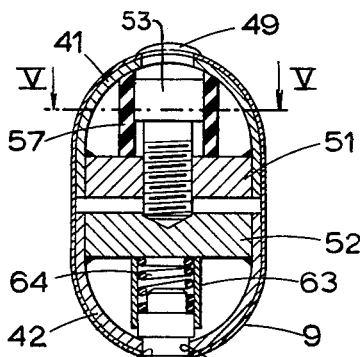
FIGURE 4 is a cross-sectional view taken on the line IV—IV of FIGURE 3.
Figure 5:
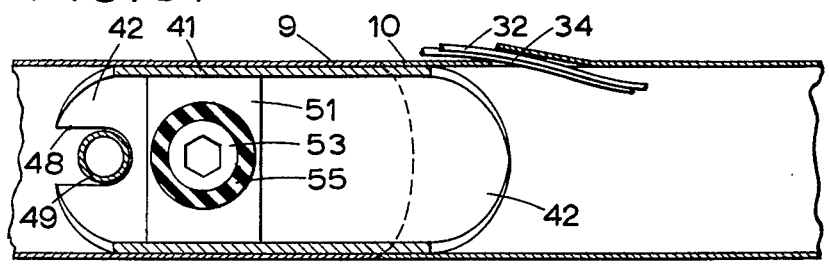
FIGURE 5 is a cross-sectional view taken on the line V—V of FIGURE 4.

The sleeve means 40 are shown in detail in FIGURES 3, 4 and 5. In cross-section the sections 9 and 10 are identical and each have the form of a flat sided oval. A half sleeve part 41 has its rear portion adhered at 43 within the upper half of the rear section 10, while a complementary sleeve part 42 has its rear portion adhered at 44 within the lower part of the rear section 10. The parts 41 and 42 are adhered together at 46 while a rounded portion at 47 ensures that when small relative displacements of the parts 41 and 42 occur the joints at 43, 44 and 46 are not unduly stressed.

At their front ends the sleeve parts 41 and 42 are each formed with a notch 48 which, when the sleeve parts are inserted into the front section 9, are adapted to register with and receive a rod 49 fixed within the section 9.

The sleeve parts 41 and 42 are each U-shaped in cross section as shown in FIGURE 4. Fixed across the mouth of the part 41 is a bar 51 and a further bar 52 is fixed across the mouth of the part 42. The bar 51 has a threaded aperture in which is screwed a bolt 53 which can be rotated by a key 54 to bear against the bar 52 thereby to urge the bars 51 and 52 with their respective sleeve parts 41 and 42 apart from one another and into clamping engagement with the interior wall of the front section 9 of the backbone.

Access to the head of the bolt 53 is provided through an aperture 55 in the section 9 which is adapted to be brought into alignment with an aperture 56 in the sleeve part 41. The numeral 57 indicates a rubber guide sleeve.

Clamping of the sleeve parts 41 and 42 within the section 8 can be readily achieved by screwing down the bolt 53 while correct alignment of the sections 9 and 10 is obtained on assembly and maintained thereafter by the notches 48 engaging the rod 49. However, to ensure that a safe degree of clamping is obtained in the event of the bolt 53 not being properly tightened down, as well as to provide some indication that the sleeve parts 41 and 42 have been inserted sufficiently far into the section 9, there is provided a spring urged safety plunger 60 which engages in apertures 61 and 62 in the section 9 and in the sleeve part 42 respectively, when said apertures are brought into alignment.

The plunger 60 is guided within a sleeve 63 fixed to the bar 52 and is urged downwardly by a spring 64.

When it is desired to release the section 10 of the backbone from the section 9, it is necessary first to unscrew the bolt 53 so that the sleeve parts 41 and 42 are no longer urged apart from one another, whereafter upon the plunger 60 being disengaged from the slot 62 the sleeve parts 41 and 42 may be withdrawn. When, on the other hand, the sections 9 and 10 are to be joined together the sleeve parts 41 and 42 are inserted into the section 9 until the notch 48 is engaged by the rod 49 and the plunger 60 engages in the apertures 62, whereafter the bolt 53 may be rotated by means of the key 54 to effect firm and secure clamping of the sections.

It will be seen from the drawings that the backbone, formed by the sections 9 and 10, forms the sole connection between the front post 6 and the rear half of the bicycle and that the junction of the sections 9 and 10 is located in the least stressed region of the backbone, that is towards the front end thereof and well clear of the highly stressed region of the housing 20.

Indeed it is an important feature for reasons of strength and safety that the triangular structure formed by the tubes 10, 11 and 18 is very strong, as the maximum loads are generated in this region when the bicycle is being ridden. Consequently, no provision is made for detachability of the frame elements in this region, in contra-distinction to some previous collapsible bicycles.

For similar reasons the separable connection is located in rear of the junction between the section 9 and the front post 6 since this latter region is also subjected to stress when the bicycle is ridden. As opposed to some previous proposals, where the seat tube passes through and extends downwardly from the backbone and carries a housing for the pedal cranks at its lower end, that is significantly spaced from the backbone; according to the present invention the housing 20 is adhered directly to the underside of the rear backbone section 10, so as to be located in the strong region of the frame provided by the triangular structure of the tubes 10, 11 and 18 referred to above. By this arrangeemnt the forces applied by the rider when pedalling are transmitted to the strongest region of the frame where they cannot result in twisting, distortion or fracture of the frame elements even though the latter may have relatively small thickness and dimensions.

The sleeve means generally designated 40 by which the front and rear backbone sections are detachably connected together are wholly contained within the hollow interior of the backbone. This is advantageous, since where such connecting means are visible they may have an unattractive appearance and more important they may constitute a potential hazard as the rider's body or clothing may be caught on projecting parts of the connecting means. The provision of the plunger 60 is further evidence of the care which has been taken to make the vehicle safe for the rider.

The provision of wheels 1 and 2 which are considerably smaller than those of conventional bicycles enables great economy of space to be achieved while the provision of resilient suspension systems at front and rear effectively compensates for the small size of the wheels.

By the present invention a two-wheeled cycle vehicle which is readily separable into two or more sections for ease of stowage or transportation, is achieved.

I claim:

1. A two-wheeled pedal cycle vehicle comprising front and rear rubber tyred wheels each wheel being of an overall diameter of between 14 and 18 inches, a frame formed by (a) a tubular main frame backbone being a flat sided oval in cross-section and extending longitudinally of the vehicle downwardly inclined rearwardly thereof, (b) a front tube upstanding from the front end of the backbone and housing a steering column which is surmounted by handlebars, (c) a seat tube upstanding from the backbone rearwardly spaced from the front tube and surmounted by a saddle, (d) a tubular housing for a pedal crank axle extending transversely of and adherred to the underside of the backbone at a point immediately below the junction of the seat tube and backbone, (e) a substantially straight longitudinal bracing member extending from a point on the upper side of the backbone ahead of the seat tube at a distance equal to at least one third of the distance separating the seat from the front tube rearwardly to adjoin the seat tube at a position below the midpoint thereof, (f) said backbone forming the sole frame member connecting the front tube with the remainder of the frame and being formed of two interengaging front and rear sections which are separable one from the other at a point ahead of the junction of the longitudinal bracing member with the backbone and said rear backbone section being provided at its front end with forwardly projecting sleeve means which are insertable into the open hollow rear end of the front section.

2. A two-wheeled pedal cycle vehicle as defined in claim 1, wherein said sleeve means comprise upper and lower complementary sleeve parts fixed within the hollow interior of the rear backbone section towards its front end and including manually operable clamp means effective to cause said upper and lower sleeve parts to diverge so as to bring them into clamping engagement with the wall of the hollow interior of said front backbone section.

3. A two-wheeled pedal cycle vehicle as defined in claim 2, wherein the sleeve parts have notches at their forward end and wherein said front backbone section has fixed transversely across its hollow interior a rod which, when said sleeve parts are inserted into said hollow interior of said front backbone section, is engaged by and in said notches for the purpose of ensuring corrected alignment of said front and rear backbone sections when they are interengaged.

4. A two-wheeled cycle vehicle as defined in claim 1, wherein said front backbone section is provided towards its rear end with an aperture in its wall, and wherein the sleeve means provided on the rear backbone section has a spring loaded plunger adapted to engage in said aperture when the front and rear backbone sections are interengaged.

5. A two-wheeled pedal cycle vehicle comprising front and rear tyred wheels, a frame, said wheels having an outside diameter between 14 and 18 inches and being resiliently mounted on said frame, said frame including a substantially straight main frame member extending from a point above said front wheel toward said rear wheel and terminating at a point spaced from the forward end of said rear wheel, said main frame member having upstanding substantially at right angles from its front end above the front wheel, a post member housing a steering column which is surmounted by handlebars, a seat tube surmounted by a saddle, said post member and seat tube each being of a length equal to at least half the distance between them and connected at their lower ends to said frame member to form a frame of open F-shape, a housing for a pedal crank axle secured to the bottom of said main frame member below said seat post member, a horizontal pivot bearing being disposed on the rear portion of said main frame member at a point spaced forwardly of a leading edge of said rear wheel and spaced rearwardly from said pedal crank axle housing, a trailing arm structure pivotally mounted on said bearing, said arm structure extending rearwardly from said main frame member on both sides of said rear wheel to mount a spindle of the rear wheel, and a single rubber spring member carried on said main frame member in rear of said pedal crank axle housing and operatively connected between said main frame member and arm structure and adapted to resiliently control relative pivotal movement between said frame member and arm structure, and said main frame member being formed of interengaging front and rear sections which are separable longitudinally one from the other at a point which is nearer to said front post member than it is to said seat tube, and including manually operable clamp means for temporarily maintaining said front and rear sections interengaged in longitudinal alignment.

6. A two-wheeled pedal cycle vehicle comprising front and rear rubber tired wheels each wheel being of an overall diameter of between 14 and 18 inches, a frame formed by a tubular main frame backbone being a flat sided oval in cross-section and extending longitudinally of the vehicle downwardly inclined rearwardly thereof, a front tube upstanding from the front end of the backbone and housing a steering column which is surmounted by handlebars, a seat tube upstanding from the backbone rearwardly spaced from the front tube and surmounted by a saddle, a tubular housing for a pedal crank axle extending transversely of and adhered to the underside of the backbone at a point immediately below the junction of the seat tube and backbone, a substantially straight longitudinal bracing member extending from a point on the upper side of the backbone ahead of the seat tube at a distance equal to at least one third of the distance separating the seat tube from the front tube rearwardly to adjoin the seat tube at a position below the midpoint thereof, said longitudinal bracing member being a hollow tube and extending rearwardly of the seat tube, and including a load bearing platform disposed above the rear wheel of the vehicle, said platform having a forwardly projecting spigot which is detachably engageable in the hollow rear end of said tubular bracing member and including manually operable clamp means for temporarily securing said spigot in said hollow end of said tubular bracing member, said backbone forming the sole frame member connecting the front tube with the remainder of the frame and being formed of two interengaging front and rear sections which are separable one from the other at a point ahead of the junction of the longitudinal bracing member with the backbone.

7. A two-wheeled pedal cycle vehicle comprising front and rear rubber tired wheels each wheel being of an overall diameter of between 14 and 18 inches, a frame formed by a tubular main frame backbone being a flat sided oval in cross-section and extending longitudinally of the vehicle downwardly inclined rearwardly thereof, a front tube upstanding from the front end of the backbone and housing a steering column which is surmounted by handlebars, a seat tube upstanding from the backbone rearwardly spaced from the front tube and surmounted by a saddle, a tubular housing for a pedal crank axle extending transversely of and adhered to the underside of the backbone at a point immediately below the junction of the seat tube and backbone, a substantially straight longitudinal bracing member extending from a point on the upper side of the backbone ahead of the seat tube at a distance equal to at least one third of the distance separating the seat from the front tube rearwardly to adjoin the seat tube at a position below the midpoint thereof, said backbone forming the sole frame member connecting the front tube with the remainder of the frame and being formed of two interengaging front and rear sections which are separable one from the other at a point ahead of the junction of the longitudinal bracing member with the backbone, and including a braking device for the rear wheel, a control cable extending between the braking device and including manually operable quick-release clamping means for clamping said control lever to said handlebars and for detaching said lever from said handlebars while maintaining the adjustment of the lever, the cable and the brake device relative to one another.

8. A two-wheeled pedal cycle vehicle comprising front and rear rubber tired wheels each wheel being of an overall diameter of between 14 and 18 inches, a frame formed by a tubular main frame backbone being a flat sided oval in cross-section and extending longitudinally of the vehicle downwardly inclined rearwardly thereof, a front tube upstanding from the front end of the backbone and housing a steering column which is surmounted by handlebars, a seat tube upstanding from the backbone rearwardly spaced from the front tube and surmounted by a saddle, a tubular housing for a pedal crank axle extending transversely of and adhered to the underside of the backbone at a point immediately below the junction of the seat tube and backbone, a substantially straight longitudinal bracing member extending from a point on the upper side of the backbone ahead of the seat tube at a distance equal to at least one third of the distance separating the seat from the front tube rearwardly to adjoin the seat tube at a position below the midpoint thereof, said backbone forming the sole frame member connecting the front tube with the remainder of the frame and being formed of two interengaging front and rear sections which are separable one from the other at a point ahead of the junction of the longitudinal bracing member with the backbone, and said front and rear wheels being resiliently mounted for movement relative to said frame.

References Cited by the Examiner

UNITED STATES PATENTS

| | | | |
|---|---|---|---|
| 1,563,094 | 11/1925 | Ledig | 280—281 |
| 2,645,509 | 7/1953 | Valenta | 287—2 |
| 2,861,815 | 11/1958 | Willinger | 280—278 |
| 3,083,039 | 3/1963 | Moulton | 280—277 |

FOREIGN PATENTS

| | | |
|---|---|---|
| 560,709 | 4/1957 | Italy. |
| 1,017,589 | 9/1952 | France. |

BENJAMIN HERSH, *Primary Examiner.*

KENNETH H. BETTS, MILTON BUCHLER,
*Examiners.*